(12) United States Patent
Ting et al.

(10) Patent No.: US 7,406,228 B2
(45) Date of Patent: Jul. 29, 2008

(54) BACKLIGHT MODULE STRUCTURE FOR LED CHIP HOLDER

(75) Inventors: Chu-Chi Ting, Hua-Lien (TW); Tien-Lung Chiu, Kaohsiung (TW); Wei-Yang Tseng, Hsin-Chu (TW); Wei-Yu Lo, Taichung (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 0 days.

(21) Appl. No.: 11/315,235

(22) Filed: Dec. 23, 2005

(65) Prior Publication Data

US 2007/0116424 A1 May 24, 2007

(30) Foreign Application Priority Data

Nov. 11, 2005 (TW) .............................. 94139829 A

(51) Int. Cl.
G02B 6/26 (2006.01)
G02B 6/42 (2006.01)
(52) U.S. Cl. ...................................................... 385/39
(58) Field of Classification Search ................. 385/39
See application file for complete search history.

(56) References Cited

U.S. PATENT DOCUMENTS

2002/0167811 A1* 11/2002 Blanchard ................... 362/318
2003/0206256 A1* 11/2003 Drain et al. .................. 349/113
2004/0170373 A1*  9/2004 Kim ........................... 385/147
2005/0264718 A1* 12/2005 Katsu et al. .................... 349/61
2006/0098456 A1*  5/2006 Sakamoto et al. ............ 362/625
2006/0221610 A1* 10/2006 Chew et al. .................. 362/247

* cited by examiner

Primary Examiner—M. R. Connelly-Cushwa
Assistant Examiner—Kajli Prince
(74) Attorney, Agent, or Firm—Birch, Stewart, Kolasch & Birch, LLP

(57) ABSTRACT

The present invention provides a backlight module for a light emitting device (LED) chip holder. The backlight module includes a top guide-light board, a bottom guide-light board, a chip holder with an inclined plane thereon, and a light emitting diode chip. One side of the top guide-light board and the bottom guide-light board has a reflective sheet, and the light emitting diode chip is located on the inclined surface of the chip holder, and further the light emitting diode chip is embedded in the bottom guide-light. When the light emitting diode chip emits incident light, the light produces the total reflection on the bottom guide-light board to reflect to the reflective mirror. Then, the light is reflected to the top guide-light board by the reflective sheet, and is emitted out from the top guide-light board to be a light source for the backlight module.

15 Claims, 6 Drawing Sheets

BACKLIGHT MODULE STRUCTURE FOR LED CHIP HOLDER

1. FIELD OF THE INVENTION

The present invention generally relates to a light emitting diode structure, particularly to indicate to a structure for a LED chip holder with backlight module thereon.

2. DESCRIPTION OF THE PRIOR ART

Following the improvement and promotion of display manufacturing technology, the features of LCD (Liquid crystal display) is small size, and low radiation. Thus, LCD has been replacing the conventional CRT (cathode ray tube) display gradually. In general, the backlight modules of the conventional LCD display utilizes the cold cathode fluorescent lamp (CCFL) as the light emitting source. However, the cold cathode fluorescent lamp cannot turn-on under the lower temperature. Therefore, the conventional LCD needs to add the heating apparatus to assist the LCD to turn on at lower temperature. Thus, it is to be valued that the light emitting diode (LED) to be the backlight module for the light source recently.

LED is a light emitting source with small size and higher optical efficiency. The LCD can apply to the indicator and the variety of light source with different colors. In recently, RGB (red, green, and blue) LED has been developed, and can be applied for large display screen. In addition, LED display screen can operate under the lower power consumption and long operating life.

FIG. 1A and FIG. 1B show a conventional LED backlight module. The LED backlight module 1100 includes a first reflective sheet 1110A, a top guide-light board 1110 that includes a plurality of marks 1114 thereon, a bottom guide-light board 1112, a first reflective mirror 1116, a second reflective sheet 1118, a third reflective sheet 1120, a flat metal substrate 1122, a light emitting diode chip 1124, and a second reflective mirror 1126. The light emitting diode chip 1124 is positioned on the flat metal substrate 1122. The top guide-light board 1110 is combined with the bottom guide-light board 1112, and the first reflective mirror 1116 is located on one side of both the top guide-light board 1110 and the bottom guide-light board 1112. The second reflective sheet 1118 is located under the top guide-light board 1110 and the bottom guide-light board 1112, and the third reflective sheet 1120 is located under the bottom guide-light board 1112. The flat metal substrate 1122 is located under the bottom guide-light board 1112, and is provided to load the light emitting diode chip 1124 thereon to release the heat which is generated from the light emitting diode chip 1124. The part of the light emitting diode chip 1124 of chip holder 1100 is combined with the second reflective mirror 1126, such that the partial of the light emitting diode 1124 is covered by the second reflective mirror 1126. Herein, the epoxy resin 1128 can fill with the space between the reflective mirror 1126 and the flat metal substrate 1122, wherein the refractive index of epoxy resin 1128 is as same as refractive index of the bottom guide-light board 1112.

The light 1130 is emitted through the second reflective sheet 1118 from the light emitting diode chip 1124 and the reflection is generated by the third reflective sheet 1120. Then, the light 1130 is reflected to the top guide-light board 1110 by way of the first reflective mirror 1116. Next, the light 1130 is reflected by the first reflective sheet 1110A to the plurality of marks 1114, and the total reflection optical path would be destroyed by the plurality of marks 1114, such that the light 1130 will emit out via the top guide-light board 1110.

However, the light emitting diode chip 1124 is positioned parallel to the chip holder 1122 (flat metal substrate) as shown in FIG. 1B. When the backlight module 1100 is provided with the light emitting diode chip 1124 that operates, the incident angle of the light is unfavorable to cause the illumination that will not be unity. Further, the light also cannot spread the uniform illumination over the top guide-light board 1110, thus, the illumination efficiency would be reduced when the light emitting diode chip 1124 is positioned parallel the chip holder 1122.

SUMMARY OF THE INVENTION

According to the invention background described above, a conventional LED backlight module includes many disadvantages. Thus, the present invention provides a backlight module with light emitting diode chip to improve the illumination efficiency and to provide the high brightness.

It is an object of the present invention to disclose a backlight module with a light emitting diode chip. The backlight module includes a bended metal substrate to be a chip holder. The light emitting diode chip is positioned on the inclined plane of the bended metal substrate. Thus, the light emitting diode chip emits the light at a specific angle, and then the total reflection light would be generated among the bottom guide-light board. The total reflection light would be destroyed by the plurality of marks on the top guide-light board, such that the destroyed total reflection light would be emitted out from the top guide-light board to be the backlight source.

It is another object of the present invention to disclose a bended metal substrate to be a chip holder for a backlight module. The light emitting diode chip is positioned on the inclined plane of the bended metal substrate, and the bended metal substrate is positioned in the cave of bottom guide-light board. After the top guide-light board is assembled the bottom guide-light board, the light emitting diode chip can emit the light with high illumination efficiency and high brightness.

It is a further object of the present invention to embed a light emitting diode chip in a side of the bottom guide-light board. The light emitting diode chip emits light to generate the total reflection light among the bottom guide-light board.

A further object of the present invention is to embed the light emitting diode chip in the side of the bottom guide-light board. Then, the top guide-light board is assembled the bottom guide-light board. The light is emitted from the light emitting diode chip, and is generated the reflection among the bottom guide-light board. Then, the total reflection light is generated by the plurality of reflective mirrors on the fours side of the bottom guide-light board.

According to the object, the present invention discloses a backlight module with a light emitting diode chip. The backlight module includes a top guide-light board, a bottom guide-light board, and a chip holder. A reflective mirror is located on one side of both the top guide-light board and bottom guide-light board. A metal substrate is a chip holder to support the light emitting diode chip, wherein the light emitting diode chip is positioned on the inclined plane of the metal substrate, which is embedded in the bottom guide-light board, and the flat plane of the metal substrate is located under the bottom guide-light board. When the light emitting diode chip emits the light, the light will reflect via the reflective mirror to the top guide-light board, and later, the light will emit out from the top guide-light board.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1A:
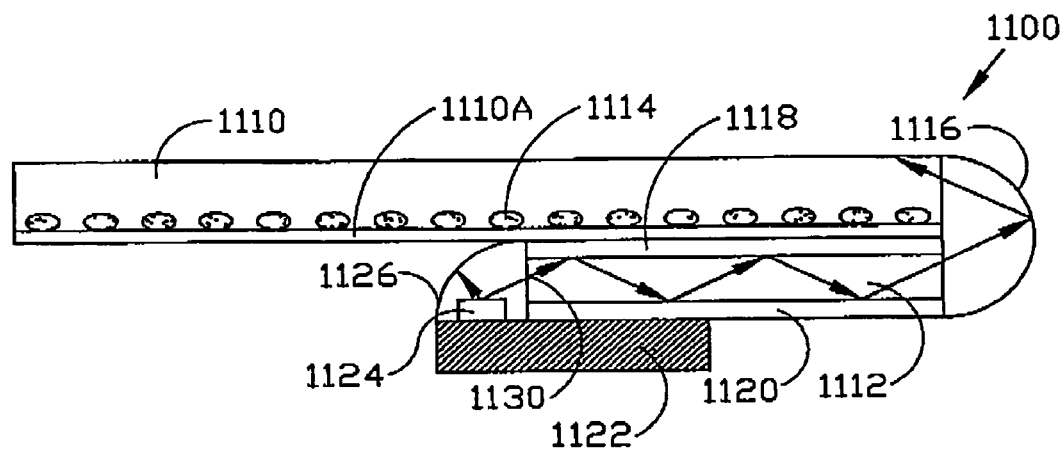
FIG. 1A and FIG. 1B show a conventional LED backlight module structure.
Figure 1B:
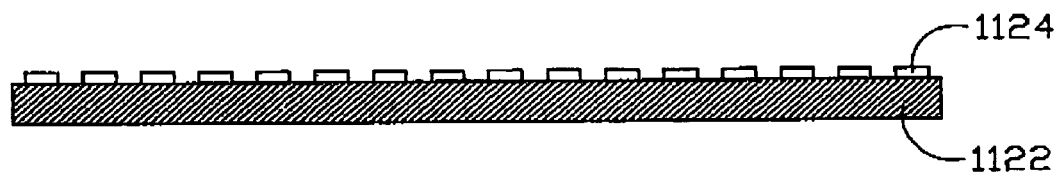
Figure 2:
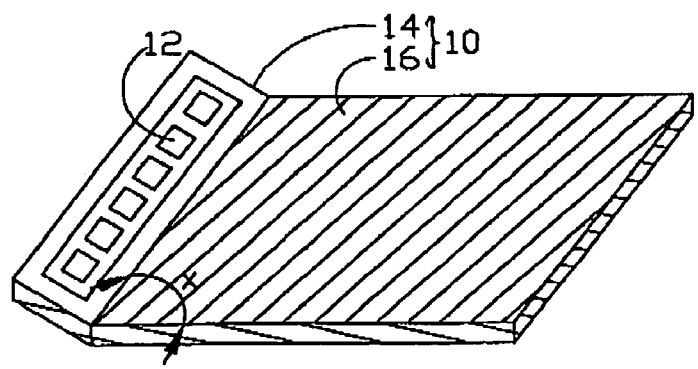
FIG. 2 shows a bended metal substrate used as a chip holder to support light emitting diode chips according to the present invention.

FIG. 2 shows a bended metal substrate to be a chip holder to support a light emitting diode chip according to the present invention. A metal substrate 10 includes an angle between an inclined plane 14 and a flat plane 16. A light emitting diode chip 12 is positioned on the inclined plane 14 of the metal substrate 10. The included angle x between the inclined plane 14 and the flat plane 16 is larger than 90 degree and is smaller than 180 degree. The light emitted from the light emitting diode chip 12 has high brightness and high illumination efficiency when the light is reflected to the top guide-light board (not shown) at a specific included angle. In addition, another function of the metal substrate 10 is dissipated the heat when the light emitting diode chip 12 is operated.

Figure 3A:
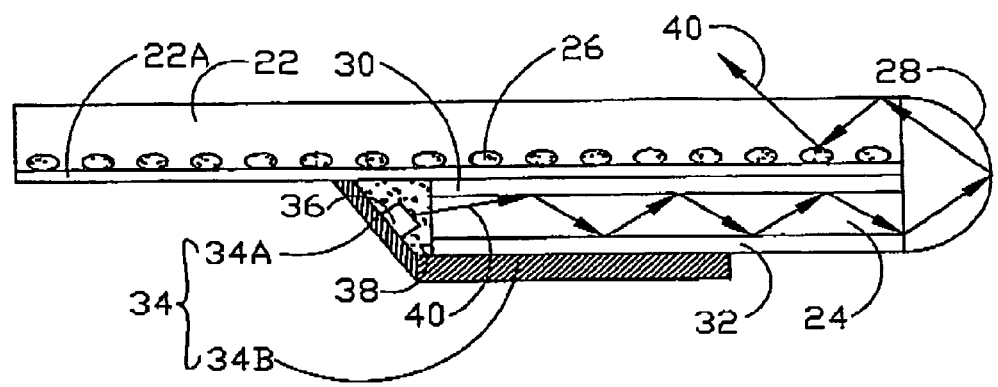
FIG. 3A shows a backlight module with a RGB light emitting diode chip according to one preferred embodiment of the present invention.

FIG. 3A shows a backlight module with a RGB light emitting diode chip according to one preferred embodiment of the present invention. A first reflective sheet 22A is located under a top guide-light board 22. A second reflective sheet 30 is located on a bottom guide-light board 24, and a third reflective sheet 32 is located under the bottom guide-light board 24. When light 40 is emitted from a RGB light emitting diode chip 36, the function of both the second reflective sheet 30 and the third reflective sheet 32 used to generate the total reflection light among the bottom guide-light board 24. Then, the hybrid illumination would be generated by the total reflection effect. A reflective mirror 28 is located on one side of the bottom guide-light board 24 and the top guide-light board 22 to reflect the light 40 form the bottom guide-light board 24 to the top guide-light board 22. Herein, the shape of the reflective mirror 28 is dependent upon the refractive index of the bottom guide-light board 24. In addition, the shape of the reflective mirror 28 is elliptic, or any shape corresponding to the refractive index of the bottom guide-light board 24. Thus, a flat plane 34B of a chip holder 34 is located under the bottom guide-light board 24, and an inclined plane 34A of the chip holder 34 is located on the other side of the bottom guide-light board 24. Because of the chip holder 34 includes the inclined plane 34A, and a space is positioned between the bottom guide-light board 24 and the inclined plane 34A of the chip holder 34. Thus, the space can be filled with the material such as epoxy resin 38 with a specific refractive index as same as the refractive index of the bottom guide-light board 24. Therefore, the light 40 emitted from the light emitting diode chip 36 can improve the incident illumination efficiency via the different refractive indexes.

When the RGB light emitting diode chip 36 emits the light 40, the light 40 would be introduced by the first reflective sheet 30 and the second reflective sheet 32 to generate the total reflection light among the bottom guide-light board 24. Then, the total reflection light is reflected to the top guide-light board 22 after the light 40 is reflected to the reflective mirror 28. When the reflected light is reflected to a plurality of marks 26 in the top guide-light board 22, the total reflection optical path of the total reflection light would be destroyed by the plurality of marks 26. Thus, the destroyed total reflection light can emit out from the top guide-light board 22 to be a light source for the backlight module.

Figure 3B:
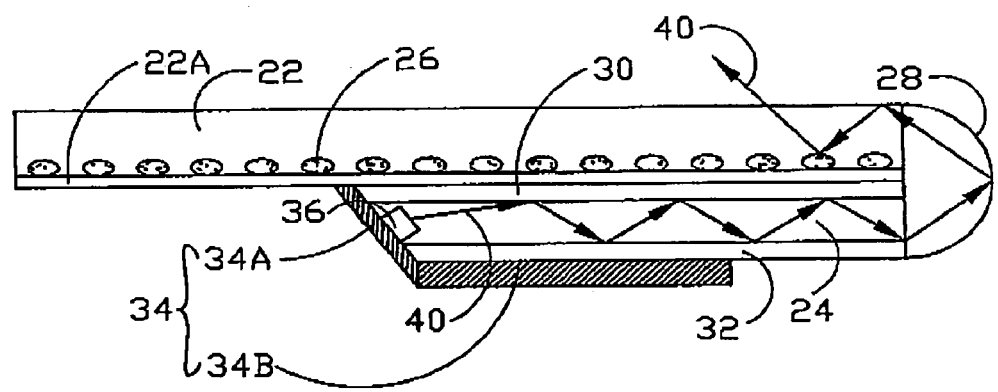
FIG. 3B shows another preferred embodiment of a backlight module with a light emitting diode chip according to the present invention.

FIG. 3B shows another preferred embodiment of a backlight module with a light emitting diode chip according to the present invention. FIG. 3B illustrates the backlight module as same as that disclosed by FIG. 3A. The difference between FIG. 3A and FIG. 3B is that one side of the bottom guide-light board 24 is an inclined plane as is shown in FIG. 3B. The inclined plane of the bottom guide-light board 24 can assemble with the inclined plane 34A of the chip holder 34, such that the light emitting diode chip 36 can be embedded in the inclined plane of the bottom guide-light board 24. Therefore, there is no space between the bottom guide-light board 24 and the chip holder 34.

When the light emitting diode chip 36 emits the light 40, the light 40 would be introduced by the second reflective sheet 30 and the third reflective sheet 32 to generate the total reflection light among the bottom guide-light board 24. Then, the total reflection light is reflected to the top guide-light board 22 via the reflective mirror 28. The total reflection light would be reflected to the plurality of marks 26 to destroy the total reflection optical path of the total reflection light 40. Thus, the destroyed total reflection light 40 can emit out from the top guide-light board 22 to be a light source for the backlight module.

Figure 4:
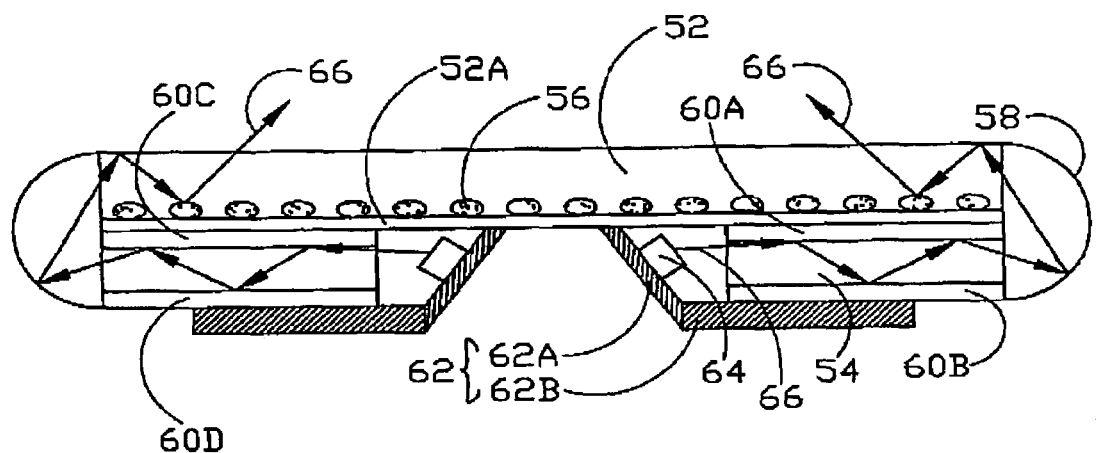
FIG. 4 illustrates a backlight module with RGB light emitting diode chips that emits RGB light from two sides of the backlight module.

FIG. 4 illustrates a backlight module with two chip holders supporting two RGB light emitting diode chips that emits RGB light from two sides of the backlight module. The backlight module includes a top guide-light board 52, at least two bottom guide-light boards 54, at least two reflective mirrors 58, at least four reflective sheets 60A, 60B, 60C, and 60D, at least two chip holders 62, and at least two light emitting diode chips 64. Each of two chip holders 62 has an inclined plane 62A and a flat plane 62B located under each of two bottom guide-light boards 54. Each of the two light emitting diode chips 64 is located on the inclined plane 62A of each of two chip holders 62 respectively. At least two bottom guide-light boards 54 are positioned under the two sides of the top guide-light board 52.

A reflective mirror 58 is located on one side of both top guide-light board 52 and each of two bottom guide-light boards 54. The shape of the reflective mirror 58 is dependent upon the refractive index of the bottom guide-light board 54. In addition, the shape of the reflective mirror 58 can be the elliptic, or any shape corresponding to the refractive index of the bottom guide-light board 54. Each of two chip holders 62 is located under each of two bottom guide-light boards 54 respectively. A space is positioned between the top guide-light board 52, the bottom guide-light board 54, and the inclined plane 62A of the chip holder 62. The space can be filled with the epoxy resin with a specific refractive index as same as the refractive index of two bottom guide-light boards 54. Thus, the illumination efficiency of the light would not be reduced due to the different refractive index between the epoxy resin and the bottom guide-light board 54.

When the RGB light emitting diode chip 64 emits a light 66, the light 66 would be introduced to the total reflection at a specific angle by the first reflective sheet 60A, the second reflective sheet 60B, the third reflective sheet 60C, and the fourth reflective sheet 60D among the two bottom guide-light boards 54. Then, the total reflection light is reflected to the top guide-light board 52 through the two reflective mirrors 58. Then, the total reflection light is reflected to the plurality of marks 56 to destroy the total reflection optical path of the total reflection light, such that the destroyed total reflection light can emit out from the top guide-light board 52 to be a light source for the backlight module.

Figure 5A:
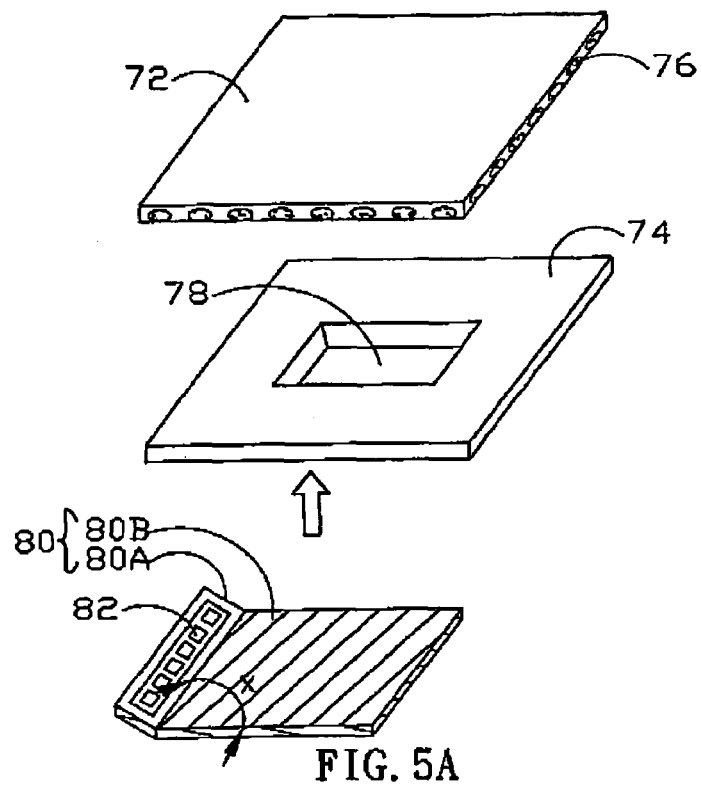
FIG. 5A and FIG. 5B illustrates a backlight module with RGB light emitting diode chips as a light source according to the present invention.
Figure 5B:
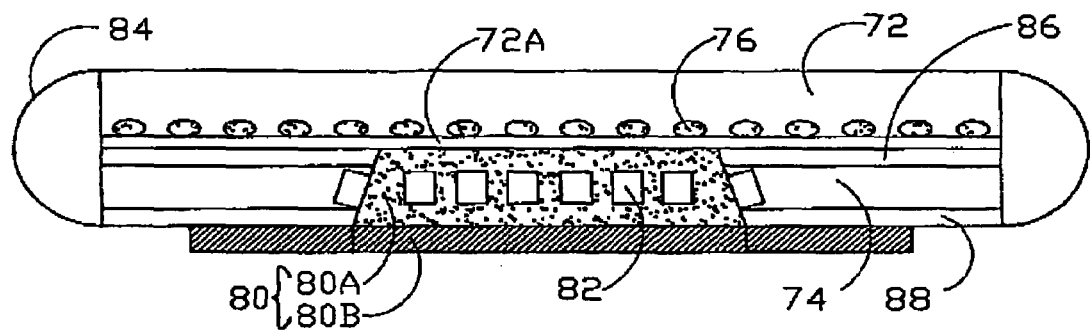

FIG. 5A and FIG. 5B illustrate a backlight module with RGB light emitting diode chips as light source according to the present invention. The backlight module includes a top guide-light board 72, and the top guide-light board 72 includes a plurality of marks 76 therein and a first reflective sheet 72A thereunder. The backlight module further includes a bottom guide-light board 74 with a cave 78 therein. The shape of the cave 78 can be rectangular, and the four sides of the cave 78 with an inclined angle x. This inclined angle x is corresponding to the included angle between an inclined plane 80A of a chip holder 80 and a flat plane 80B of the chip holder 80. When the top guide-light board 72 is assembled with the bottom guide-light board 74, the cave 78 of the bottom guide-light board 74 can match the inclined plane 80A of the chip holder 80.

Also, the backlight module of this embodiment includes a plurality of top reflective sheets, a plurality of bottom reflective sheets (not shown in FIG. 5A), a plurality of reflective mirrors (not shown), and a plurality of light emitting diode chips 82. Each row of the plurality of light emitting diode chips 82 is located on each of four inclined planes 80A of the chip holder 80 respectively. Then, the plurality of top reflective sheets are located above the bottom guide-light board 74, and the plurality of bottom reflective sheets (not shown in FIG. 5A) are located under on the bottom guide-light board 74. Next, the chip holder 80 with the plurality of light emitting diode chips 82 are located on the four inclined plane of the cave 78 within the bottom guide-light board 74. Thus, the inclined plane 80A of the chip holder 80 can link with the bottom guide-light board 74. Thus, the plurality of light emitting diode chips 82 would be embedded in the bottom guide-light board 74 directly, and there is no space between the chip holder 80 and the bottom guide-light board 74 as shown in FIG. 5B.

Figure 6:
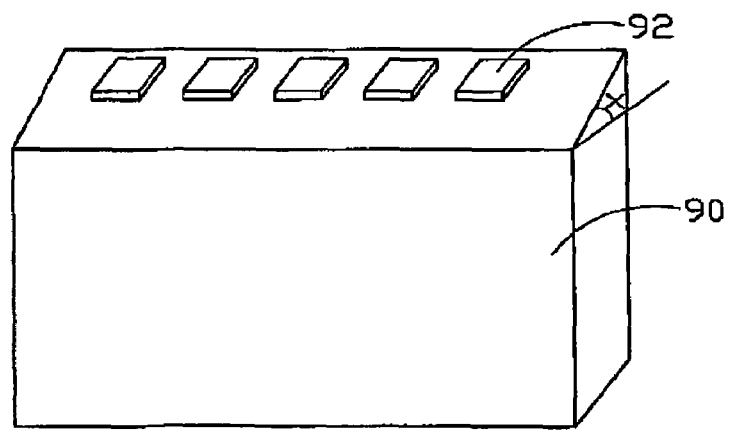
FIG. 6 illustrates a backlight module with light emitting diode chips according to another preferred embodiment of the present invention.

FIG. 6 illustrates a backlight module with light emitting diode chips according to further another preferred embodiment of the present invention. A metal substrate 90 is to be a chip holder, and a plurality of light emitting diode chips 92 is located on an inclined plane of metal substrate 90. An inclined angle is included between the inclined plane and the flat plane of the chip holder 90. The light emitting diode chips 92 can emit the light with high illumination efficiency and high brightness at a specific included angle. The function of the metal substrate 90 is used to dissipate the heat that is generated from the light emitting diode chips 92. In addition, the types of the light emitting diode chip 92 is RGB light emitting diode chip or white light emitting diode chip.

Figure 7:
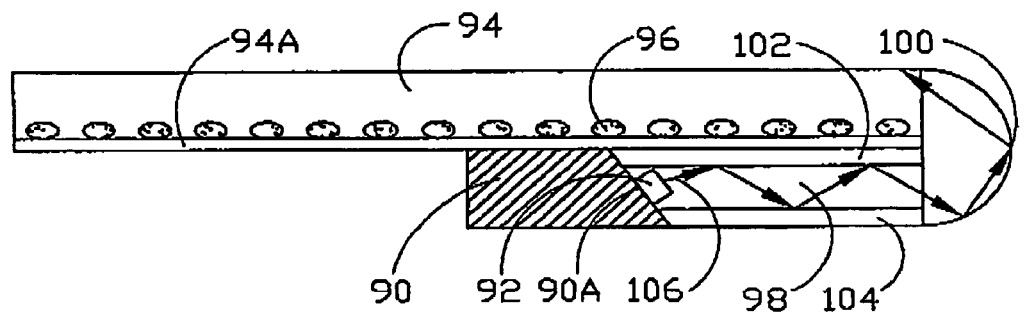
FIG. 7 illustrates the backlight module that provides a RGB light emitting diode chip to emit light from two sides of the backlight module according to another preferred embodiment of the present invention.

FIG. 7 illustrates a backlight module with RGB light emitting diode chips to emit light from one side of the backlight module according to further another preferred embodiment of the present invention. The backlight module includes a top guide-light board 94, a plurality of marks 96 located within the top guide-light board 94, and a first top reflective sheet 94 located on the top guide-light board 94. The backlight module further includes a bottom guide-light board 98, a reflective mirror 100, a first bottom-reflective sheet 102, a second bottom-reflective sheet 104, a chip holder 90, and the light emitting diode chips 92. The light emitting diode chips 92 are located on the inclined plane 90A of the chip holder 90. In addition, the shape of the reflective mirror 100 can be elliptic, or any shape that corresponds to the refractive index of the bottom guide-light board 98.

It is noted that the bottom guide-light board 98 includes an inclined plane on one side of the bottom guide-light board 98. When the plurality of light emitting diode chips 92 of the chip holder 90 is embedded in the bottom guide-light board 98, the inclined plane 90A of the chip holder 90 can joint with the inclined plane of the bottom guide-light board 98.

Moreover, a first reflective sheet 102 is located between the top guide-light board 94 and the bottom guide-light board 98. A second reflective sheet 104 is located under the bottom guide-light board 98. Both the first reflective sheet 102 and second reflective sheet 104 are used to introduce the light 106 which is emitted from the light emitting diode chips 92 to become the total reflection light among the bottom guide-light board 98. Thus, the total reflection light can become the hybrid illumination via the total reflection effect when the total reflection light is reflected among the bottom guide-light board 98. The reflective mirror 100 is positioned on one side of both the top guide-light board 94 and the bottom guide-light board 98.

When the light emitting diode chips 92 emit the light 106, the light would be became the total reflection light through the reflection between the first reflective sheet 102 and the second reflective sheet 104. The total reflection light is reflected to the top guide-light board 94 through the reflective mirror 100. Then, the total reflection light would be destroyed by the plurality of marks 96, such that the destroyed total reflection light would be emitted to be a light source for the backlight module.

Figure 8:
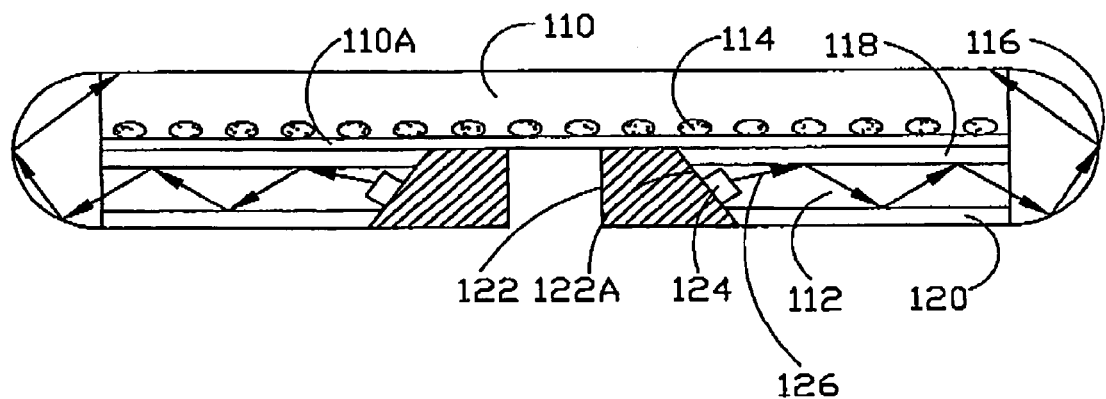
FIG. 8 illustrates further another embodiment of a backlight module with light emitting diode LED chips or white light emitting diode chips as light source according to the present invention.

FIG. 8 illustrates a backlight module utilizing RGB LED chips or LED chips as light source according to further another embodiment of the present invention. It is noted that the same structures or the relationship will not be discussed again. The backlight module includes a top guide-light board 110 that includes a plurality of marks 114 therein and a reflective sheet 110A thereon. The backlight module also includes at least two bottom guide-light boards 112, a plurality of first reflective sheets 118 and a plurality of second reflective sheet 120, a plurality of reflective mirrors 116, two chip holders 122, and two light emitting diode chips 124. Each row of light emitting diode chips 124 is located on each inclined plane of each of two chip holders 122 separately, and each row of light emitting diode chips 124 is embedded in the inclined plane of the bottom guide-light board 112 which is located under the top guide-light board 110.

The light emitting diode chips 124 can emit light 126 at a specific included angle from the inclined plane 122A of the chip holder 122 to provide light 126 with good illumination efficiency and high brightness. The range of the specific included angle is larger than 90 degree and is smaller than 180 degree. The first reflective sheet 118 is located between the top guide-light board 110 and the bottom guide-light board 112, and the second reflective sheet 120 is located under the bottom guide-light board 112. Both first reflective sheet 118 and second reflective sheet 120 are used to introduce the light 126 to cause the total reflection light among the bottom guide-light board 112. Thus, the total reflection light would be hybridized to be the hybrid illumination.

When the light emitting diode chip 124 emits the light 126, the light 126 would become the total reflection light through the reflection effect between the first reflective sheet 118 and the second reflective sheet 120. The total reflection light is reflected to the top guide-light board 110 through the reflective mirror 116. Then, the total reflection light would be destroyed by the plurality of marks 114, such that the destroyed total reflection light would be emitted out from the top guide-light board 110 to be a light source for the backlight module.

Figure 9A:
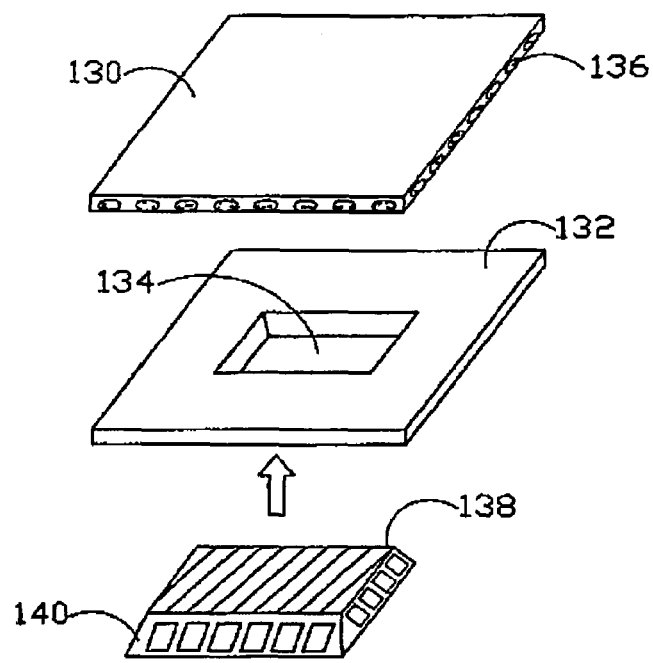
FIG. 9A illustrates further another embodiment of a backlight module with light emitting diode chips as light source according to the present invention.
Figure 9B:
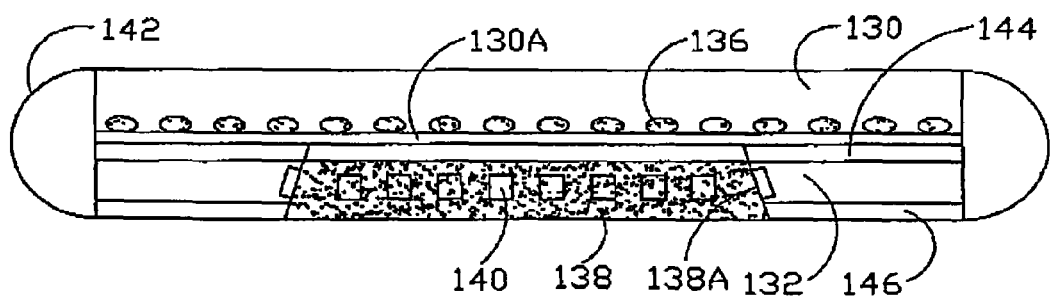
FIG. 9B shows the completely structure for the backlight module with the light emitting diode chip that according to the embodiment of FIG. 9A of the present invention.

FIG. 9A illustrates a backlight module with light emitting diode chips as light source according to the present invention. FIG. 9B shows the completely structure for the backlight module with the light emitting diode chips according to the embodiment of FIG. 9A of the present invention. Referring to FIG. 9A, the backlight module includes a top rigid guide-light board 130, a bottom guide-light board 132 with a cave 134 therein, a plurality of first reflective sheets 144, a plurality of second reflective sheets 146, a plurality of chip holders 138, and a plurality of light emitting diode chips 140, wherein each row of the plurality of light emitting diode chips 140 is located on each inclined plane 138A of the plurality of chip holders 138. The side of the cave 134 of the bottom guide-light board 132 is an inclined plane, which is corresponding to the inclined plane 138A of the chip holder 138. When the bottom guide-light board 132 is combined with the top guide-light board 130, the cave 134 of the bottom guide-light board 132 can match with the inclined plane 138A of the chip holder 138.

Also referring to FIG. 9A, the chip holder 138 with the light emitting diode chips 140 are located on four sides of the inclined plane 138A of the chip holder 138. The chip holder 138 is assembled with the bottom guide-light board 132. Thus, the light emitting diode chips 140 can embed in the inclined plane of the bottom guide-light board 132 as shown in FIG. 9B. If the light emitting diode chips 140 are RGB light emitting diode chips, the reflective sheet (not shown) would be utilized in the backlight module to introduce the light to become the total reflection light, so as to cause the hybrid illumination among the bottom guide-light board 132. Then, the hybrid illumination would be reflected through the reflective mirror (not shown) to the top guide-light board 130. Later, the optical path of the hybrid illumination is destroyed by way of the plurality of marks 136, and then the hybrid illumination would be emitted out from the top guide-light board 130 to be a light source for the backlight module.

What are described above are only the preferred embodiments of the present invention, which are not used to limit the claims of the present invention; as for the above description, professionals that are familiar with the present technical field are able to understand and put into practice, and therefore, the equivalent changes or modifications made within the spirit disclosed by the present invention should be included in the appended claims.

What is claimed is:

1. A light emitting diode chip backlight module, comprising:
   a top guide-light board;
   a bottom guide-light board located under said top guide-light board;
   a chip holder having a flat plane and a inclined plane, wherein said flat plane is disposed under said bottom light-guide board to decrease the thickness of the backlight module, and said inclined plane bends toward an inclined side of said bottom guide-light board, having an angle between said flat plane and said inclined plane, said angle being larger than 90 degrees and less than 180 degrees;
   a light emitting diode chip disposed on said bent plane; and
   a reflective mirror located on the other side of said bottom guide-light board and a side of said top guide-light board, wherein said reflective mirror reflects light from said bottom guide-light board to said top guide-light board.

2. The light emitting diode chip backlight module according to claim 1, wherein said top guide-light board comprises a plurality of marks therein.

3. The light emitting diode chip backlight module according to claim 1, wherein said chip holder comprises a metal substrate.

4. The light emitting diode chip backlight module according to claim 1, wherein said light emitting diode chip comprises a red, green, and blue (RGB) light emitting diode chip.

5. The light emitting diode chip backlight module according to claim 1, wherein said light emitting diode chip comprises a white light emitting diode chip.

6. The light emitting diode chip backlight module according to claim 1, further comprising a first reflective sheet, a second reflective sheet, and a third reflective sheet, said first reflective sheet located between said top guide-light board and said bottom guide-light board, said second reflective sheet located between said first reflective sheet and said bottom guide-light board, and said third reflective sheet located under said bottom guide-light board.

7. The light emitting diode chip backlight module according to claim 1, further comprising an epoxy resin covering said light emitting diode chip.

8. The light emitting diode chip backlight module according to claim 1, wherein said light emitting diode chip is embedded in said bottom guide-light board.

9. A light emitting diode chip backlight module, comprising:
   a top guide-light board;
   a bottom guide-light board having a cave therein, and said bottom guide-light board being located under said top guide-light board;
   a chip holder located on a side of said cave of said bottom guide-light board, said chip holder having a flat plane and a inclined plane, wherein said flat plane is disposed under said bottom guide-light board to decrease the thickness of the backlight module, and said inclined plane bends toward said side of said cave of said bottom guide-light board, having an angle between said flat plane and said inclined plane, said angle being larger than 90 degrees and less than 180 degrees;

a light emitting diode chip disposed on said bent plane; and a reflective mirror located on the other side of both said bottom guide-light board and one side of said top guide-light board, wherein said reflective mirror reflects light from said bottom guide-light board to said top guide-light board.

10. The light emitting diode chip backlight module according to claim 9, wherein said top guide-light board comprises a plurality of marks therein.

11. The light emitting diode chip backlight module according to claim 1, wherein said chip holder comprises a metal substrate.

12. The light emitting diode chip backlight module according to claim 9, wherein said light emitting diode chip is embedded into said bottom guide-light board.

13. The light emitting diode chip backlight module according to claim 9, further comprising a first reflective sheet, a second reflective sheet, and a third reflective sheet, said first reflective sheet located between said top guide-light board and said bottom guide-light board, said second reflective sheet located between said first reflective sheet and said bottom guide-light board, and said third reflective sheet located under said bottom guide-light board.

14. The light emitting diode chip backlight module according to claim 9, wherein said light emitting diode chip comprises a red, green, and blue (RGB) light emitting diode chip.

15. The light emitting diode chip backlight module according to claim 9, wherein said light emitting diode chip comprises a white light emitting diode chip.

* * * * *